United States Patent [19]

Oguri et al.

[11] 3,708,554
[45] Jan. 2, 1973

[54] RUBBER COMPOSITION

[75] Inventors: Hiroki Oguri, Toyonaka; Hideo Nagasaki, Minoo, both of Japan

[73] Assignee: Taoka Dyestuffs Manufacturing Co., Ltd., Osaka, Japan

[22] Filed: Feb. 18, 1970

[21] Appl. No.: 12,455

[30] Foreign Application Priority Data

March 8, 1969, Japan ..................................44/17768

[52] U.S. Cl. .....260/848, 260/23.7 M, 260/33.6 AQ, 260/38, 260/41.5 R, 260/897 R, 260/897 A
[51] Int. Cl..........C08g 37/16, C08d 9/08, C08d 9/10
[58] Field of Search ......260/845, 848, 897 R, 897 A, 260/897 B

[56] References Cited

UNITED STATES PATENTS

| | | | |
|---|---|---|---|
| 3,366,707 | 1/1968 | Delalande et al. | 260/846 |
| 3,070,570 | 12/1962 | Gessler et al. | 260/897 R |
| 3,299,170 | 1/1967 | Gonzenbach | 260/848 |
| 3,334,063 | 8/1967 | Berliner | 260/897 R |
| 3,354,107 | 11/1967 | Hamed | 260/848 |
| 3,402,140 | 9/1968 | Bickel et al. | 260/848 |
| 3,514,417 | 5/1970 | Bickel et al. | 260/848 |

*Primary Examiner*—John C. Bleutge
*Attorney*—Stevens, Davis, Miller & Mosher

[57] ABSTRACT

The tackiness of a terpolymer rubber of ethylene, propylene and a nonconjugated diene is remarkably improved by incorporating therein (1) an alkylphenol-formaldehyde resin, alkylphenol-acetaldehyde resin, or alkylphenol-acetylene resin and (2) a thermoplastic resin produced by the polymerization of olefinic unsaturated hydrocarbons derived from the cracking of petroleum hydrocarbons, and containing substantially no aromatic hydrocarbons. This effect of the specific combination of two kinds of resin is synergetic. In addition to the improved tackiness, said rubber composition retains an excellent age resistance and a high capacity for loading fillers, both characteristics being inherent in said terpolymer rubber.

8 Claims, No Drawings

RUBBER COMPOSITION

This invention relates to an ethylene-propylene-nonconjugated diene terpolymer rubber (hereinafter referred to as EPDM) composition with improved tackiness.

Whereas EPDM has an excellent age resistance, a high capacity for loading fillers, and other valuable properties, it has, on the other hand, serious disadvantages including a poor tackiness, an insufficient mechanical fatigue resistance, and a low tear characteristics. To overcome these disadvantages, there have been proposed various tackifiers for EPDM, such as for example alkylphenol-formaldehyde resins, alkylphenol-acetylene resins, xylene-formaldehyde resins, coumarone-indene resins, etc. However, no satisfactory result has, heretofore, been obtained.

The present inventors had investigated on the increased tackifying effect of mixtures of two kinds of tackifier, and, as a result, disclosed that the tackiness of synthetic rubbers such as SBR, IIR, CR and NBR could be remarkably increased due to the synergetic effect, by incorporating therein a reactive alkylphenol-formaldehyde resin together with a petroleum resin produced by the polymerization of a petroleum fraction containing hydrocarbons having four or more carbon atoms (see Japanese Pat. Publication No. 17,659/'66). Said combination of two types of resin, however, was found not so effective in improving the tackiness of EPDM as might become of a commercial importance. As a result of further investigations, we have now found that when a special grade of the so-called petroleum resin, which consists essentially of aliphatic hydrocarbons accompanying practically no aromatic hydrocarbons, is used in combination with an alkylphenol-formaldehyde resin, alkylphenol-acetaldehyde resin, or an alkylphenol-acetylene resin, the tackiness of EPDM can be increased by the synergetic effect to the level that is desirable for commercialization, said high level being entirely unexpectable from the performance of a mixture of an alkylphenol-formaldehyde resin and the usual petroleum resin containing an appreciable amount of aromatic hydrocarbons (Cf. Table 1).

An object of the present invention is to provide an EPDM composition having an increased tackiness.

Another object of the invention is to provide an EPDM composition which retains the excellent properties inherent in EPDM and having, in addition, sufficient tackiness to be put into industrial practice.

Other objects and merits of the invention will become apparent from the following description.

According to the present invention, an EPDM composition with improved tackiness is provided, which comprises (1) EPDM, (2) an alkylphenol-formaldehyde resin, an alkylphenol-acetaldehyde resin, or an alkylphenol-acetylene resin (hereinafter referred to as component A), and (3) a thermoplastic resin produced by the polymerization of olefinic unsaturated hydrocarbons derived from the cracking of petroleum hydrocarbons, and containing practically no aromatic hydrocarbons (hereinafter referred to as component B).

When the above-mentioned combination of components A and B is used in an EPDM composition, an unpredictably superior tackiness can be imparted to the composition, the combined effect being far greater than that expectable from the respective effects of the components A and B when used alone. For instance, the results as shown in Table 1 were obtained in the case of an ethylene-propylene-ethylidene norbornene terpolymer rubber.

TABLE 1

| Composition No.<br>Component | I | II | III | IV | V |
|---|---|---|---|---|---|
| Ethylene-propylene-ethylidene norbornene terpolymer rubber (parts by weight) | 100 | 100 | 100 | 100 | 100 |
| Reactive octylphenol-formaldehyde resin (parts by weight) | 5 | 1.25 | 1.25 | — | — |
| Petroleum resin containing aromatic hydrocarbons ("Petrosin", trade mark of Mitsui Petrochemical) (parts by weight) | — | 3.75 | — | — | 5 |
| Petroleum resin containing no aromatic hydrocarbons ("Piccopale", trade mark of Esso Chemicals) (parts by weight) | — | — | 3.75 | 5 | — |
| Tackiness (g/cm) | 280 | 440 | 1000 | 310 | 200 |

As is clear from Table 1, the combination of components A and B exhibits a synergetic effect. The discovery of this fact by the present inventors, which was surprisingly unexpected, has led to the present invention which is of a high commercial value in that it facilitates the industrial application of EPDM.

The EPDM composition of the invention retains the advantageous properties of EPDM such as an excellent age resistance and a desirable high capacity for loading fillers, and no significant change is recognized in other properties.

The use of the component A or B alone as a tackifier for rubber is known in prior art. However, the synergetic effect upon EPDM of the specific combination of these two components according to the present invention is not predictable from prior knowledge.

The alkylphenols in the alkylphenol-formaldehyde resin, alkylphenol-acetaldehyde resin and alkylphenol-acetylene resin which are used as the component A in the present invention, are phenols substituted by alkyl groups having one to 12 carbon atoms, such as for example m-cresol, m-isopropylphenol, p-tert.-butylphenol, p-tert.-octylphenol, p-nonylphenol, p-n-dodecylphenol, etc., or mixtures of these phenols. More particularly, the following alkylphenol resins are preferable as the component A of the present composition: A reactive or nonreactive p-tert.-octylphenol-formaldehyde resin formed by the condensation reaction between p-tert.-octylphenol and formaldehyde, and having a methylol content of 0 to 15 percent, a softening point of 70° to 110° C., and an acid value of 5 to 50; a p-tert.-butylphenol-acetaldehyde resin formed by the condensation reaction between p-tert.-butylphenol and acetaldehyde, and having a softening point of 90° to 110° C. and a specific gravity of 1.0 to 1.1; and a p-tert.-butylphenol-acetylene resin produced by the condensation reaction between p-tert.-butylphenol and acetylene, and having a specific gravity of 1.0 to 1.1 and a softening point of 100° to 180° C.

The component B of the present composition is a thermoplastic resin containing substantially no aromatic hydrocarbons, which is produced by the polymerization of a mixture of mono- and di-olefinic unsaturated hydrocarbons derived from the cracking of petroleum hydrocarbons. A particularly preferable resin is produced by polymerizing a mixture of mono- and di-olefins having five or six carbon atoms and 5- or 6-membered cyclic mono-and di-olefins, the resultant resin having a softening point of 70° to 110° C., a molecular weight of 500 to 2,000, and a bromine value of 20 to 70. This resin is an aliphatic hydrocarbon resin having a saturated or unsaturated 5- or 6-membered ring as a basic structure, and an alkyl group of one to four carbon atoms as a side chain, and contains substantially no aromatic hydrocarbons. Higher content of the cyclic structure in the resin results in more striking effect upon the improvement in tackiness of the present composition containing said resin. The resin consisting of only aliphatic hydrocarbons is, of course, the most preferable as the component B, but the presence of a small amount of aromatic hydrocarbons in the resin does not appreciably affect the improvement in tackiness and other physical properties of the present composition containing said resin.

In the present composition, a weight ratio of component A to component B can be varied over a range of 1 : 9 to 9 : 1, preferably from 2 : 8 to 5 : 5. For example, ratios of 2.5 : 7.5 and 4 : 6 are both preferable, the maximum synergetic effect being achieved in the former ratio.

The compounding ratio of EPDM to the sum of components A and B in the present composition is 20 parts or less, preferably 5 to 15 parts by weight per 100 parts by weight of EPDM.

The present composition can be prepared by mixing EPDM and the components A and B together in a way similar to that generally used in rubber compounding, such as, for example, by the use of example, testing roll mill or a Banbury mixer. Alternatively, the present composition can be produced by compounding into EPDM, by the same means as that mentioned above, a mixture of the components A and B, which have been previously prepared by mixing both components in molten state. It is also possible that the components A and B are dissolved in and mixed with, for example, a solution of EPDM in n-hexane obtained in the course of manufacturing EPDM, and then the n-hexane is removed for recovery to give as a residue the present composition of EPDM.

The present composition may contain other suitable ingredients preferably used with EPDM, such as fillers, pigments, plasticizers, processing aids, and vulcanizing agents including particularly sulfur or other compounds acting similarly to sulfur, and vulcanization accelerators.

The EPDM employed in the present composition is a terpolymer of ethylene, propylene and a nonconjugated diene such as dicyclopentadiene, 1,4-hexadiene, methylene norbornene, ethylidene norbornene, 1,5-cyclooctadiene, all of these dienes being well known in the art.

The tackiness of the present composition was evaluated by measuring the tackiness of test pieces by the well-known pick-up method (using an automatic pick-up tackmeter made by Toyo Seiki Seisaku-Sho Ltd.), said test pieces being prepared as follows: EPDM, the components A and B, and the usual compounding ingredients for rubber were milled in a usual way to produce an EPDM compound, which was then formed into a sheet on a calender roll, and thereafter the surface of the sheet was conditioned for one day before making the measurement.

In the case of a rubber composition containing a conventional tackifier, the tackiness of the calendered sheet prepared therefrom generally tends to decrease when the surface of the sheet is aged for a long period of time. Contrary to this general tendency, the tackiness of the present composition rather increases with the ageing of the surface, the phenomenon being one of the features of the present composition.

The rubber compositions of the present invention can be used in any application of the EPDM.

The features of this invention will be further illustrated in detail with reference to the following examples. These examples are not intended to limit the invention. In the examples, all parts and percentages are by weight.

EXAMPLE 1

The compositions (A) to (F) of Table 2 were prepared by mixing on a testing roll mill an EPDM, an alkylphenol-formaldehyde resin, and a thermoplastic petroleum resin in proportions shown in Table 2, with the addition of the following compounding ingredients for rubber:

|   | Parts |
|---|---|
| Stearic acid | 1 |
| zinc oxide | 5 |
| HAF black | 80 |
| Process oil | 40 |
| Tetramethylthiuram monosulfide | 1.5 |
| Mercaptobenzothiazole | 0.5 |
| sulfur | 1.5 |

The EPDM rubber used was a terpolymer rubber of ethylene, propylene and dicyclopentadiene ("Royalene 301," trade mark of Uniroyla Co.). The alkylphenol-formaldehyde resin used was a nonreactive tert.-octylphenol-formaldehyde resin having a methylol content of 2 percent or less, a softening point of 93.5° C., and an acid value of 21.3. The thermoplastic petroleum resin used was "Piccopale 100" (trade mark; a product of Esso Chemicals Co.) having a softening point of 100° C., a molecular weight of 1400, and a bromine value of 36, and consisting of an aliphatic hydrocarbon containing no aromatic hydrocarbons and having a 6-membered ring as a basic structure and a methyl group as a side chain. The tackiness of the compositions were as shown in Table 2. As is clearly seen from the Table, the tackiness of each composition from (B) to (E) of the present invention which contains both components A and B was far superior to that of the compositions (A) and (F) containing either the compound A alone or the component B alone.

TABLE 2

| Composition No. | (A) | (B) | (C) | (D) | (E) | (F) |
|---|---|---|---|---|---|---|
| Royalene 301 (parts) | 100 | 100 | 100 | 100 | 100 | 100 |
| p-tert.-Octylphenol-formaldehyde resin (parts) | — | 1.7 | 2.5 | 5.0 | 7.5 | 10 |
| Piccopale 100 (parts) | 10 | 8.3 | 7.5 | 5.0 | 2.5 | — |
| Tackiness (g/cm) | 350 | 920 | 1,000 | 970 | 940 | 320 |

EXAMPLE 2

The compositions (H) to (K) in Table 3 were prepared in the following manner:

An alkylphenol-formaldehyde resin and a thermoplastic resin were mixed in molten state in a proportion of 25 : 75 and the resultant mixture was dissolved in a solution of a terpolymer rubber of ethylene, propylene and ethylidene norbornene in n-hexane, and then the n-hexane was removed for recovery to give as the residue the EPDM compositions, the proportions of said resin mixture to the rubber component therein being as shown in Table 3. The alkylphenol-formaldehyde resin used was a reactive p-tert.-octylphenol-formaldehyde resin having a methylol content of 10 percent, a softening point of 91° C., and an acid value of 22.3. The thermoplastic resin used was prepared by polymerizing a mixture of monoolefinic and diolefinic unsaturated hydrocarbons having five to six carbon atoms, the content of 5-membered ring component in the resultant aliphatic resin being 12 percent.

Each composition (H), (I), (J) and (K) was compounded on a testing roll mill with the following ingredients for rubber compounding:

| | Parts |
|---|---|
| Stearic acid | 1 |
| Zinc oxide | 5 |
| HAF black | 50 |
| Process oil | 10 |
| Tetramethylthiuram monosulfide | 1.5 |
| Mercaptobenzothiazole | 0.5 |
| Sulfur | 1.5 |

The tackiness of each compound was measured to obtain the results as shown in Table 3. As is clearly seen from Table 3, the tackiness of each of the compositions (H), (I), (J) and (K) prepared in accordance with the present invention was far superior to that of a control composition (G). The tackiness of a composition containing 5 parts (per 100 parts of EPDM) of the above-mentioned p-tert.-octylphenol-formaldehyde resin alone, and that of a composition containing 5 parts of the above-mentioned thermoplastic resin consisting of an aliphatic hydrocarbon containing 12 percent of a 5-membered ring component was 280 and 310 g/cm, respectively.

TABLE 3

| Composition No. | (G) | (H) | (I) | (J) | (K) |
|---|---|---|---|---|---|
| Ethylene-propylene-ethylidene norbornene terpolymer rubber | 100 | 100 | 100 | 100 | 100 |
| Mixture of resins, mixed in molten state (parts) | — | 10 | 15 | 20 | |
| Tackiness (g/cm) | 120 | 850 | 1,000 | >1,000 | >1,000 |

\* A tackiness larger than 1,000 g/cm shows that the tackiness was unable to be measured owing to the measuring capacity of the testing machine used.

EXAMPLE 3

The changes with the lapse of time in the surface tackiness of the composition (H) in Example 2 were measured to obtain the results as shown in Table 4. The tackiness of the present composition was found to increase with the lapse of time.

TABLE 4

| Elapsed time (days) | 1 | 3 | 8 |
|---|---|---|---|
| Tackiness (g/cm) | 850 | 970 | >1,000 |

EXAMPLE 4

One hundred Parts of a terpolymer rubber of ethylene, propylene and 1,4-hexadiene and 10 parts of a mixture (25 : 75) of a reactive p-tert.-butylphenol-formaldehyde resin containing 10 percent of methylol group and a thermoplastic aliphatic resin containing 9 percent of a 5-membered ring component, said mixture being prepared by mixing both resins in molten state, were compounded in a Banbury mixer with the following ingredients to obtain a composition (L):

| | Parts |
|---|---|
| Stearic acid | 1 |
| Zinc oxide | 5 |
| HAF black | 50 |
| Process oil | 10 |
| Tetramethylthiuram monosulfide | 1.5 |
| Mercaptobenzothiazole | 0.5 |
| Sulfur | 1.5 |

Another composition (M) was prepared in the same manner except for the omission of the addition of the above-mentioned resin mixture. The compositions (M) and (N) thus obtained were cured at 160° C. for 10 minutes. The tackiness of both compositions and the physical properties of the cured compositions were measured to obtain the results as shown in Table 5.

TABLE 5

| Composition No. | (L) | (M) |
|---|---|---|
| Ethylene-propylene-1,4-hexadiene terpolymer rubber (parts) | 100 | 100 |
| Mixture of resins, mixed in molten state (parts) | 10 | — |
| Tackiness (g/cm) | 900 | 115 |
| Tensile strength (kg/cm$^2$) | 224 | 197 |
| Elongation (%) | 750 | 480 |
| Tensile stress at 300 % (kg/cm$^2$) | 85 | 104 |
| Hardness (Hs) | 61 | 64 |
| Growth rate of flex cracking (times) | 7.9 (40,000 cycles) | failure (3,000 cycles) |
| Tear strength (kg/cm) | 71 | 58 |

It is clear from the results shown in Table 5 that in comparison with the control composition (M), the composition (L) according to the present invention is remarkably improved in the tackiness of uncured compound as well as in the growth rate of flex cracking and tear strength of the cured compound.

EXAMPLE 5

One hundred Parts of a terpolymer rubber of ethylene, propylene and dicyclopentadiene, 2.5 parts of a p-tert.-butylphenol-acetylene resin having a specific gravity of 1.03 and a softening point of 125° to 130° C., 7.5 parts of "Piccopale 100" (the same as that used in Example 1), and the same amount of the same compounding ingredients for rubber as those used in Example 1 were mixed on a testing roll mill to obtain a composition in accordance with the invention. The tackiness of this composition was 950 g/cm. Further two compositions were prepared in a manner similar to that described above except that 10 parts of either the p-tert.-butylphenol-formaldehyde resin or "Piccopale 100" was used alone instead of using in combination. The tackiness values of these compositions were 300 g/cm and 350 g/cm, respectively.

EXAMPLE 6

One hundred Parts of a terpolymer rubber of ethylene, propylene and ethylidene norbornene, 2.5 parts of a p-tert.-butylphenol-acetaldehyde resin having a specific gravity of 1.05 and a softening point of 90° to 95° C., 7.5 parts of "Piccopale 100" (the same as that in Example 1), and the same amount of the same compounding ingredients for rubber as those used in Example 1 were mixed on a testing roll mill to obtain a composition in accordance with the invention. The tackiness of the calendered sheet of the composition thus obtained was more than 1,000 g/cm, as measured by a pick-up tackmeter. The tackiness values of two compositions prepared in a manner similar to that described above except that 10 parts of either the p-tert.-butylphenol-acetaldehyde resin or "Piccopale 100" was used alone instead of using in combination were 400 g/cm and 300 g/cm, respectively.

What is claimed is:
1. A rubber composition with improved tackiness, consisting essentially of
   1. a terpolymer rubber of ethylene, propylene, and a non-conjugated diene;
   2. a component selected from the group consisting of an alkylphenol-formaldehyde resin, alkylphenol-acetaldehyde resin, and an alkylphenol-acetylene resin; and
   3. a thermoplastic resin produced by the polymerization of a mixture of mono- and di-olefins having five or six carbon atoms and having a softening point of 70° to 110° C, a molecular weight of 500 to 2000 and a bromine value of 20 to 70, wherein the ratio by weight of component (2) to component (3) is from 1:9 to 9:1, and the total amount of components (2) and (3) is 20 parts by weight or less per 100 parts by weight of component (1).
2. A rubber composition according to claim 1, wherein the nonconjugated diene component of said terpolymer rubber is dicyclopentadiene, 1,4-hexadiene, methylene norbornene, ethylidene norbornene, or 1,5-cyclooctadiene.
3. A rubber composition according to claim 1, wherein the component (2) is a resin produced by reacting a phenol substituted by an alkyl group having one to 12 carbon atoms with formaldehyde, acetaldehyde, or acetylene.
4. A rubber composition according to claim 3, wherein the alkylphenol is m-cresol, m-isopropylphenol, p-tert.-butylphenol, p-tert.-octylphenol, p-nonylphenol, or p-n-dodecyclphenol, or a mixture thereof.
5. A rubber composition according to claim 1, which contains, in addition, ingredients generally used for rubber compounding.
6. A rubber composition according to claim 1, wherein the total amount of the components (2) and (3) is 5 to 15 parts by weight per 100 parts by weight of the component (1).
7. A rubber composition according to claim 1, wherein the component (2) is an alkylphenol-formaldehyde resin or an alkylphenol-acetylene resin.
8. A rubber composition according to claim 1, wherein the component (2) is an alkylphenol-acetaldehyde resin.

* * * * *